(12) United States Patent
Bayer et al.

(10) Patent No.: US 8,776,737 B2
(45) Date of Patent: Jul. 15, 2014

(54) SPARK IGNITION TO HOMOGENOUS CHARGE COMPRESSION IGNITION TRANSITION CONTROL SYSTEMS AND METHODS

(75) Inventors: Ethan E. Bayer, Lake Orion, MI (US); Sai S. V. Rajagopalan, Sterling Heights, MI (US); Orgun A. Guralp, Ann Arbor, MI (US); Hanho Kang, Oakland Township, MI (US); Jun-Mo Kang, Ann Arbor, MI (US); Paul M. Najt, Bloomfield Hills, MI (US)

(73) Assignee: GM Global Technology Operations LLC

( * ) Notice: Subject to any disclaimer, the term of this patent is extended or adjusted under 35 U.S.C. 154(b) by 377 days.

(21) Appl. No.: 13/344,855

(22) Filed: Jan. 6, 2012

(65) Prior Publication Data

US 2013/0174805 A1    Jul. 11, 2013

(51) Int. Cl.
F02D 13/00    (2006.01)

(52) U.S. Cl.
USPC .............. 123/90.15; 123/406.23; 123/406.35; 123/295; 123/345

(58) Field of Classification Search
USPC .............. 123/295, 305, 406.23, 406.35, 436, 123/90.15, 345–348
See application file for complete search history.

(56) References Cited

U.S. PATENT DOCUMENTS

| | | |
|---|---|---|
| 3,923,021 A | 12/1975 | Stark |
| 4,525,781 A | 6/1985 | Konomi et al. |
| 4,658,787 A | 4/1987 | Takizawa |
| 4,691,677 A | 9/1987 | Hotate et al. |
| 4,760,825 A | 8/1988 | Morita |
| 4,763,264 A | 8/1988 | Okuno et al. |
| 4,788,942 A | 12/1988 | Pouring et al. |
| 4,915,076 A | 4/1990 | Takizawa |
| 4,919,096 A | 4/1990 | Manaka et al. |
| 5,046,468 A | 9/1991 | Erhard |
| 5,074,810 A | 12/1991 | Hobbs et al. |
| 5,107,813 A | 4/1992 | Inoue et al. |
| 5,110,310 A | 5/1992 | Hobbs |
| 5,229,945 A | 7/1993 | Demizu et al. |

(Continued)

FOREIGN PATENT DOCUMENTS

| | | |
|---|---|---|
| CN | 1204003 A | 1/1999 |
| CN | 101331305 A | 12/2008 |
| JP | 2009174397 A | 8/2009 |

OTHER PUBLICATIONS

U.S. Appl. No. 12/799,753, filed Apr. 30, 2010, Amann et al.

(Continued)

*Primary Examiner* — Hai Huynh (57) ABSTRACT

A system for a vehicle includes a mode control module and a valve control module. The mode control module selectively sets an ignition mode for an engine to one of a spark ignition (SI) mode and a homogenous charge compression ignition (HCCI) mode. In response to the ignition mode transitioning from the SI mode to the HCCI mode during a first engine cycle, the valve control module operates an exhaust valve in a high lift mode during a second engine cycle, operates an intake valve in a low lift mode during the second engine cycle, and operates the exhaust and intake valves in the low lift mode during a third engine cycle. The first engine cycle is before the second engine cycle, and the second engine cycle is before the third engine cycle.

18 Claims, 7 Drawing Sheets

(56) References Cited

U.S. PATENT DOCUMENTS

| | | |
|---|---|---|
| 5,477,826 A | 12/1995 | Hara et al. |
| 5,699,253 A | 12/1997 | Puskorius et al. |
| 5,700,171 A | 12/1997 | Horton |
| 5,715,794 A | 2/1998 | Nakamura et al. |
| 5,732,382 A | 3/1998 | Puskorius et al. |
| 5,751,147 A | 5/1998 | Nakata et al. |
| 5,765,528 A | 6/1998 | Kamimaru |
| 5,771,482 A | 6/1998 | Rizzoni |
| 6,085,143 A | 7/2000 | Przymusinski et al. |
| 6,109,986 A | 8/2000 | Gaynor et al. |
| 6,485,341 B1 | 11/2002 | Lanyi et al. |
| 6,668,812 B2 | 12/2003 | Javaherian |
| 6,672,282 B2 | 1/2004 | Harrison et al. |
| 6,691,653 B2 | 2/2004 | Denz |
| 6,752,009 B2 | 6/2004 | Minich et al. |
| 6,757,606 B1 | 6/2004 | Gonring |
| 6,758,179 B1 | 7/2004 | McKay et al. |
| 6,866,024 B2 | 3/2005 | Rizzoni et al. |
| 7,047,125 B1 | 5/2006 | He et al. |
| 7,063,057 B1 | 6/2006 | Waters et al. |
| 7,117,080 B2 | 10/2006 | Sobel |
| 7,178,503 B1 | 2/2007 | Brehob |
| 7,214,110 B1 | 5/2007 | Ehlers et al. |
| 7,246,583 B2 | 7/2007 | Cinpinski et al. |
| 7,325,446 B1 | 2/2008 | Assaf et al. |
| 7,353,803 B2 | 4/2008 | Mathews et al. |
| 7,361,067 B1 | 4/2008 | Smedema |
| 7,437,233 B2 | 10/2008 | Yasui et al. |
| 7,500,470 B2 | 3/2009 | Buslepp et al. |
| 7,526,943 B2 | 5/2009 | Cubr et al. |
| 7,530,261 B2 | 5/2009 | Walters |
| 7,607,415 B2 | 10/2009 | Mathews et al. |
| 7,654,248 B2 | 2/2010 | Buslepp et al. |
| 7,685,996 B2 | 3/2010 | Brehob |
| 7,698,935 B2 | 4/2010 | Dibble |
| 7,877,174 B2 | 1/2011 | Walser et al. |
| 7,918,212 B2 | 4/2011 | Verdejo et al. |
| 8,027,782 B2 | 9/2011 | Assaf et al. |
| 8,176,896 B2 | 5/2012 | Verdejo et al. |
| 8,245,692 B2 | 8/2012 | Glugla et al. |
| 8,251,043 B2 | 8/2012 | Smith |
| 8,261,603 B2 | 9/2012 | Kondo et al. |
| 8,307,808 B2 | 11/2012 | Kaiser et al. |
| 8,387,384 B2 | 3/2013 | Quigley et al. |
| 8,392,096 B2 | 3/2013 | Mathews et al. |
| 8,532,908 B2 | 9/2013 | Morgan et al. |
| 8,612,124 B2 | 12/2013 | Verdejo et al. |
| 2002/0157639 A1 | 10/2002 | Kidokoro et al. |
| 2004/0153286 A1 | 8/2004 | Yamada |
| 2004/0236496 A1 | 11/2004 | Sobel |
| 2005/0121005 A1 | 6/2005 | Edwards |
| 2005/0204805 A1 | 9/2005 | Wakahara et al. |
| 2006/0112933 A1 | 6/2006 | Yasui et al. |
| 2006/0254560 A1 | 11/2006 | Mann et al. |
| 2006/0293827 A1 | 12/2006 | Frauenkron et al. |
| 2007/0068474 A1 | 3/2007 | Cinpinski et al. |
| 2007/0233430 A1 | 10/2007 | Singh |
| 2007/0295290 A1 | 12/2007 | Cao |
| 2008/0028387 A1 | 1/2008 | Nakagawa et al. |
| 2008/0077307 A1 | 3/2008 | Wiles |
| 2009/0048729 A1 | 2/2009 | Waters et al. |
| 2009/0090106 A1 | 4/2009 | Muller |
| 2009/0192693 A1 | 7/2009 | Bottcher et al. |
| 2009/0215331 A1 | 8/2009 | Suzuki et al. |
| 2009/0223495 A1 | 9/2009 | Ohata et al. |
| 2009/0229568 A1 | 9/2009 | Nakagawa |
| 2009/0276143 A1 | 11/2009 | Rackmil et al. |
| 2010/0083936 A1 | 4/2010 | Verdejo et al. |
| 2010/0089361 A1 | 4/2010 | Inada et al. |
| 2010/0152990 A1 | 6/2010 | Bjernetun et al. |
| 2010/0152991 A1 | 6/2010 | Suzuki |
| 2011/0067396 A1 | 3/2011 | Quigley et al. |
| 2011/0162602 A1 | 7/2011 | Smith |
| 2011/0253100 A1 | 10/2011 | Kaiser et al. |
| 2011/0265761 A1 | 11/2011 | Amann et al. |
| 2011/0283972 A1* | 11/2011 | Wermuth et al. ........ 123/406.12 |
| 2012/0078485 A1 | 3/2012 | Verdejo et al. |
| 2012/0191275 A1 | 7/2012 | Clever et al. |
| 2012/0191276 A1 | 7/2012 | Clever et al. |
| 2012/0191277 A1 | 7/2012 | Clever et al. |
| 2012/0209494 A1 | 8/2012 | Verdejo et al. |
| 2013/0047956 A1 | 2/2013 | Davis |
| 2013/0054109 A1 | 2/2013 | Buslepp et al. |

OTHER PUBLICATIONS

U.S. Appl. No. 12/984,818, filed Jan. 15, 2011, Verdejo et al.
U.S. Appl. No. 13/590,351, filed Aug. 21, 2012, Betz.
U.S. Appl. No. 13/590,369, filed Aug. 21, 2012, Betz.
U.S. Appl. No. 13/775,628, filed Feb. 25, 2013, Gwidt et al.
Chinese Search Report dated Sep. 27, 2012 for Chinese Application No. CN201110097845.3, (2 pages).
U.S. Appl. No. 13/024,726, filed Feb. 10, 2011, Julian R. Verdejo.

* cited by examiner

SPARK IGNITION TO HOMOGENOUS CHARGE COMPRESSION IGNITION TRANSITION CONTROL SYSTEMS AND METHODS

FIELD

The present disclosure relates to internal combustion engines and more particularly to variable valve lift control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. An intake valve is selectively opened to draw air into a cylinder of the engine. The air mixes with fuel to form an air/fuel mixture. The air/fuel mixture is combusted within the cylinder. An exhaust valve is selectively opened to allow the exhaust gas resulting from combustion to exit the cylinder.

One or more rotating camshafts regulate the opening and closing of the intake and/or exhaust valves. The camshafts include cam lobes that are fixed to and rotate with the camshafts. The geometric profile of a cam lobe determines a valve opening schedule. More specifically, the geometric profile of a cam lobe generally controls the period that the valve is open (duration) and the amount or distance (lift) that the valve opens.

Variable valve actuation (VVA), also called variable valve lift (VVL) improves fuel economy, engine efficiency, and/or performance by modifying valve lift and duration as a function of engine operating conditions. Two-step VVA systems include VVL mechanisms, such as hydraulically-controlled, switchable roller finger followers (SRFFs). A SRFF associated with a valve (e.g., the intake or exhaust valves) allows the valve to be lifted in two discrete modes: a low lift mode and a high lift mode. The valve lift associated with the high lift mode is greater than the valve lift associated with the low lift mode.

SUMMARY

A system for a vehicle includes a mode control module and a valve control module. The mode control module selectively sets an ignition mode for an engine to one of a spark ignition (SI) mode and a homogenous charge compression ignition (HCCI) mode. In response to the ignition mode transitioning from the SI mode to the HCCI mode during a first engine cycle, the valve control module operates an exhaust valve in a high lift mode during a second engine cycle, operates an intake valve in a low lift mode during the second engine cycle, and operates the exhaust and intake valves in the low lift mode during a third engine cycle. The first engine cycle is before the second engine cycle, and the second engine cycle is before the third engine cycle.

A method for a vehicle includes: selectively setting an ignition mode for an engine to one of a spark ignition (SI) mode and a homogenous charge compression ignition (HCCI) mode; and in response to the ignition mode transitioning from the SI mode to the HCCI mode during a first engine cycle: operating an exhaust valve in a high lift mode during a second engine cycle; operating an intake valve in a low lift mode during the second engine cycle; and operating the exhaust and intake valves in the low lift mode during a third engine cycle. The first engine cycle is before the second engine cycle, and the second engine cycle is before the third engine cycle.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts an air/fuel mixture to generate drive torque. Combustion of the air/fuel mixture within the engine may be initiated in one or more ways. For example, during operation of the engine in a spark ignition (SI) mode, spark generated by spark plugs may ignite the air/fuel mixture. During operation of the engine in a homogenous charge compression ignition (HCCI) mode, the spark plugs may be disabled, and heat from compression may ignite the air/fuel mixture.

Generally, intake and exhaust valves of the engine are operated in a high lift mode during operation in the SI mode. During operation in the HCCI mode, the intake and exhaust valves are operated in a low lift mode. The intake and exhaust valves are opened first predetermined distances (e.g., millimeters) in the high lift mode and opened second predetermined distances in the low lift mode. The first predetermined distances are greater than the second predetermined distances, respectively.

When operation of the engine is transitioned from the SI mode to the HCCI mode, the intake and exhaust valves could be transitioned from the high lift mode to the low lift mode from one engine cycle to the next engine cycle. However, if the intake and exhaust valves are transitioned from the high lift mode to the low lift mode, the amount of residual exhaust that is remaining within the cylinders of the engine during the next engine cycle may be large. Heat from the exhaust may cause ignition earlier than desired during the next engine cycle. Additionally, the exhaust displaces fresh air that could otherwise be drawn into the cylinders during the next engine cycle. The exhaust may therefore cause a decrease in engine torque output during the next engine cycle and/or cause engine knock. Additionally, as less fresh air is available for combustion with fuel, the resulting exhaust may be fuel rich.

An engine control module (ECM) controls operation of the intake and exhaust valves. When a transition from the SI mode to the HCCI mode is commanded, the ECM of the present disclosure operates the exhaust valves in the high lift mode and the intake valves in the low lift mode for at least one engine cycle between operation in the SI mode and operation in the HCCI mode. After operating the exhaust valves in the high lift mode and the intake valves in the low lift mode for at least the one engine cycle, the ECM transitions the exhaust valves to the low lift mode and operates the intake valves in the low lift mode for operation in the HCCI mode.

Figure 1A:
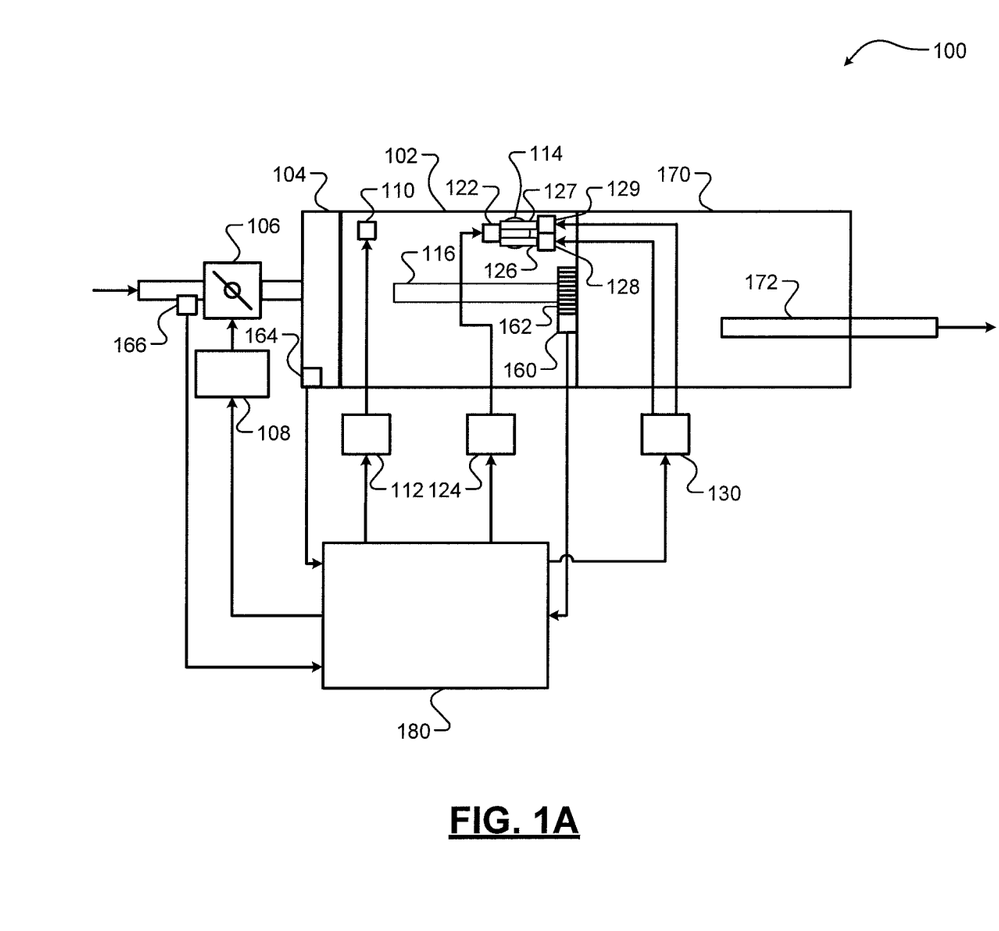
FIG. 1A is a functional block diagram of an example vehicle system according to the present disclosure.

Referring now to FIG. 1A, a functional block diagram of an example vehicle system 100 is presented. An engine 102 generates torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injectors A cylinder 114 includes a piston (not shown) that is coupled to a crankshaft 116. Although the engine 102 is depicted as including only the cylinder 114, the engine 102 may include more than one cylinder. The fuel injectors may inject fuel directly into the cylinders or at another suitable location. One combustion cycle of the cylinder 114 may include four strokes: an intake stroke, a compression stroke, an expansion stroke, and an exhaust stroke. During one revolution of the crankshaft 116 (i.e., 360 degrees of crankshaft rotation), two of the four strokes can occur. One engine cycle includes each of the cylinders undergoing one combustion cycle. One engine cycle occurs over two revolutions of the crankshaft 116 (i.e., 720 degrees of crankshaft rotation).

Figure 1B:
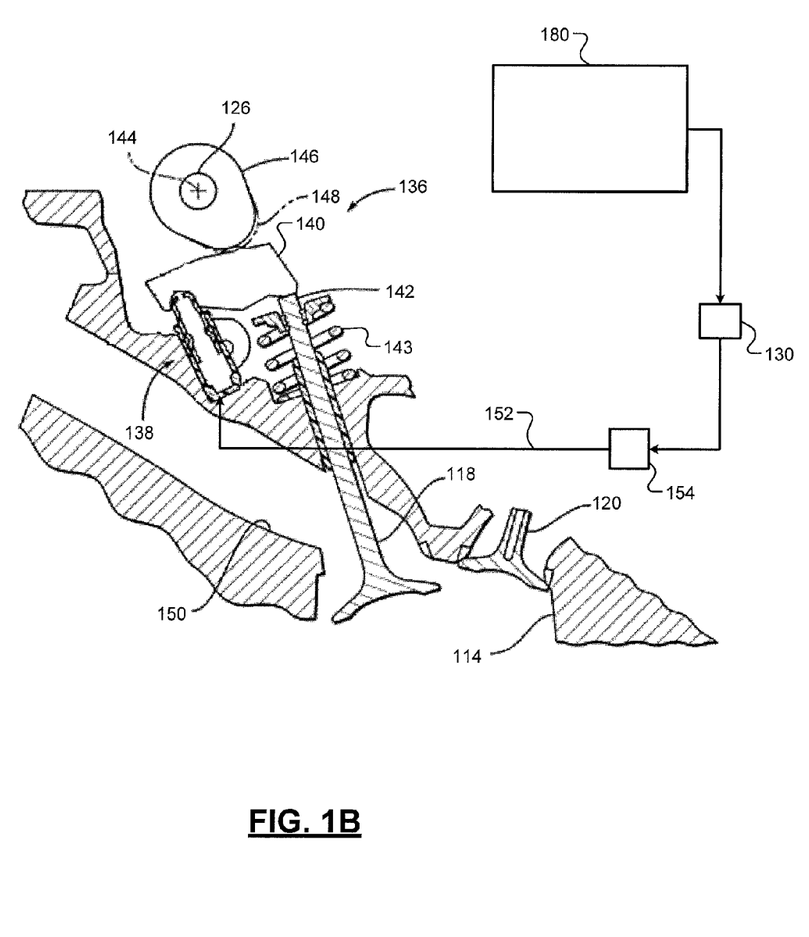
FIG. 1B is a diagram of an example variable valve lift (VVL) system according to the present disclosure.

Referring also to FIG. 1B, during the intake stroke, the piston is lowered to a bottom most position, and air and fuel may be provided to the cylinder 114. The bottom most position may be referred to as a bottom dead center (BDC) position. Air enters the cylinder 114 through one or more intake valves associated with the cylinder 114, such as intake valve 118. One or more exhaust valves, such as exhaust valve 120, are also associated with the cylinder 114. For purposes of discussion only, only the intake valve 118 and the exhaust valve 120 will be discussed.

During the compression stroke, the crankshaft 116 drives the piston toward a top most position. The top most position may be referred to as a top dead center (TDC) position. The intake valve 118 and the exhaust valve 120 are both closed during the compression stroke, and the piston compresses the contents of the cylinder 114. A spark plug 122 may ignite the air/fuel mixture during operation of the engine 102 in a spark ignition (SI) mode. A spark actuator module 124 controls the spark plug 122. Heat from compression may ignite the air/fuel mixture during operation of the engine 102 in a homogenous charge compression ignition (HCCI) mode.

Combustion of the air/fuel mixture drives the piston back toward the BDC position during the expansion stroke. The piston drives the crankshaft 116. The rotational force (i.e., torque) on the crankshaft 116 from combustion of the air/fuel mixture may be a source of compressive force for a compression stroke of a combustion cycle of a next cylinder in a predetermined firing order of the cylinders.

Exhaust resulting from the combustion of the air/fuel mixture is expelled from the cylinder 114 during the exhaust stroke. The exhaust gas is expelled from the cylinder 114 via the exhaust valve 120. While the engine 102 is described as a four-stroke engine, the engine 102 may be another suitable type of engine that can operate in both SI mode and HCCI mode.

The timing of opening and closing of the intake valve 118 is regulated by an intake camshaft 126. An intake camshaft, such as the intake camshaft 126, may be provided for each bank of cylinders of the engine 102. The timing of opening and closing of the exhaust valve 120 is regulated by an exhaust camshaft 127. An exhaust camshaft may be provided for each bank of cylinders of the engine 102. Rotation of the intake camshaft(s) and the exhaust camshaft(s) is generally driven by rotation of the crankshaft 116, such as by a belt or a chain.

A cam phaser regulates rotation of an associated camshaft. For example only, intake cam phaser 128 may regulate rotation of the intake camshaft 126. The intake cam phaser 128 may adjust the rotation of the intake camshaft 126, for example, with respect to rotation of the crankshaft 116, with respect to a position of the piston, with respect to another camshaft, etc. For example only, the intake cam phaser 128 may retard or advance rotation of the intake camshaft 126, thereby changing the opening and closing timing of the intake valve 118. An exhaust cam phaser 129 may regulate rotation of the exhaust camshaft 127. Adjusting the rotation of a camshaft with respect to rotation of the crankshaft 116 may be referred to as camshaft phasing.

A phaser actuator module 130 controls the intake cam phaser 128. The phaser actuator module 130 or another phaser actuator module may control operation of other cam phasers, such as the exhaust cam phaser 129. A cam phaser may be electrically or hydraulically actuated. Hydraulically actuated cam phasers actuate based on pressure of a hydraulic fluid (e.g., oil) supplied to the cam phaser.

A variable valve lift (VVL) mechanism 136 (FIG. 1B) is associated with the intake valve 118. For example only, the VVL mechanism 136 may include a switchable roller finger follower (SRFF) mechanism. While the VVL mechanism 136 is shown and will be discussed as a SRFF, the VVL mechanism 136 may include other types of valve lift mechanisms that enable an associated valve to be lifted to two or more discrete lift positions. While the VVL mechanism 136 is shown and will be discussed as being associated with the intake valve 118, another VVL mechanism may be implemented similarly for the exhaust valve 120. For example only, one VVL mechanism may be provided for each valve of each cylinder.

The VVL mechanism 136 includes a lift adjuster 138 and a cam follower 140. The cam follower 140 is in mechanical contact with a valve stem 142 of the intake valve 118. A biasing device 143 biases the valve stem 142 into contact with the cam follower 140. The cam follower 140 is also in mechanical contact with the intake camshaft 126 and the lift adjuster 138.

The intake camshaft 126 rotates about a camshaft axis 144. The intake camshaft 126 includes a plurality of cam lobes including low lift cam lobes, such as low lift cam lobe 146, and high lift cam lobes, such as high lift cam lobe 148. For example only, the intake camshaft 126 may include one low lift cam lobe and one high lift cam lobe for each intake valve of each cylinder. The exhaust camshaft 127 may include one low lift cam lobe and one high lift cam lobe for each exhaust valve of each cylinder. For purposes of discussion only, only operation of the intake valve 118 will be discussed.

The low and high lift cam lobes 146 and 148 rotate with the intake camshaft 126. Air may flow into the cylinder 114 through an inlet passage 150 when the intake valve 118 is open. Airflow into the cylinder 114 through the inlet passage 150 is blocked when the intake valve 118 is closed. The intake valve 118 is selectively opened and closed via the intake camshaft 126. More specifically, one of the low lift cam lobe 146 and the high lift cam lobe 148 opens and closes the intake valve 118 during a given combustion cycle.

A cam lobe contacting the cam follower 140 applies a force to the cam follower 140 in the direction of the valve stem 142 and the lift adjuster 138. The lift adjuster 138 is collapsible to allow the intake valve 118 to be opened to two discrete positions, a low lift position and high lift position. Pressure of a hydraulic fluid 152 controls which one of the low lift cam lobe 146 and the high lift cam lobe 148 opens the intake valve 118 during a given combustion cycle.

The hydraulic fluid 152 may be provided to the lift adjuster 138 at a predetermined low lift pressure and at a predetermined high lift pressure to regulate opening of the intake valve 118 in a low lift mode and a high lift mode, respectively. For example only, the predetermined low lift pressure may be approximately 10 pounds per square inch (psi) or another suitable pressure, and the predetermined high lift pressure may be approximately (25 psi) or another suitable pressure.

During operation in the low lift mode, the low lift cam lobe 146 causes the VVL mechanism 136 to pivot in accordance with the geometry of the low lift cam lobe 146. The pivoting of the VVL mechanism 136 caused by the low lift cam lobe 146 opens the intake valve 118 a first predetermined amount or distance. During operation in the high lift mode, the high lift cam lobe 148 causes the VVL mechanism 136 to pivot in accordance with the geometry of the high lift cam lobe 148. The pivoting of the VVL mechanism 136 caused by the high lift cam lobe 148 opens the intake valve 118 a second predetermined amount or distance. The second predetermined amount or distance is greater than the first predetermined amount or distance.

A fluid control valve 154 regulates the flow of the hydraulic fluid 152 to the lift adjuster 138. The phaser actuator module 130 or another actuator module controls the fluid control valve 154 to control the pressure of the hydraulic fluid 152 provided to the lift adjuster 138. The fluid control valve 154 may also be referred to as an oil control valve (OCV).

A crankshaft position sensor 160 (FIG. 1A) monitors an N-toothed wheel 162 and generates a crankshaft position signal based on rotation of the N-toothed wheel 162. For example only, the crankshaft position sensor 160 may include a variable reluctance (VR) sensor or another suitable type of crankshaft position sensor. The N-toothed wheel 162 rotates with the crankshaft 116. A manifold absolute pressure (MAP) sensor 164 monitors pressure within the intake manifold 104 and generates a MAP signal based on the pressure. In various implementations, vacuum within the intake manifold 104 may be measured, where the vacuum is measured relative to ambient pressure. A mass air flowrate (MAF) sensor 166 monitors mass flowrate of air flowing through the throttle valve 106 and generates a MAF signal based on the mass flowrate. One or more other sensors may also be implemented.

The engine 102 transfers torque to a transmission 170. The transmission 170 may include a manual type transmission, an automatic type transmission, an auto-manual type transmission, or another suitable type of transmission. The transmission 170 may transfer torque to one or more wheels (not shown) via a transmission output shaft 172 and a driveline (not shown).

An engine control module (ECM) 180 controls the throttle valve 106 via the throttle actuator module 108 and controls the fuel injectors via the fuel actuator module 112. The ECM 180 controls the spark plugs via the spark actuator module 124. The ECM 180 controls phasing of the intake and exhaust valves via the phaser actuator module 130. The ECM 180 may also control intake and exhaust valve lift via the phaser actuator module 130.

Figure 2:
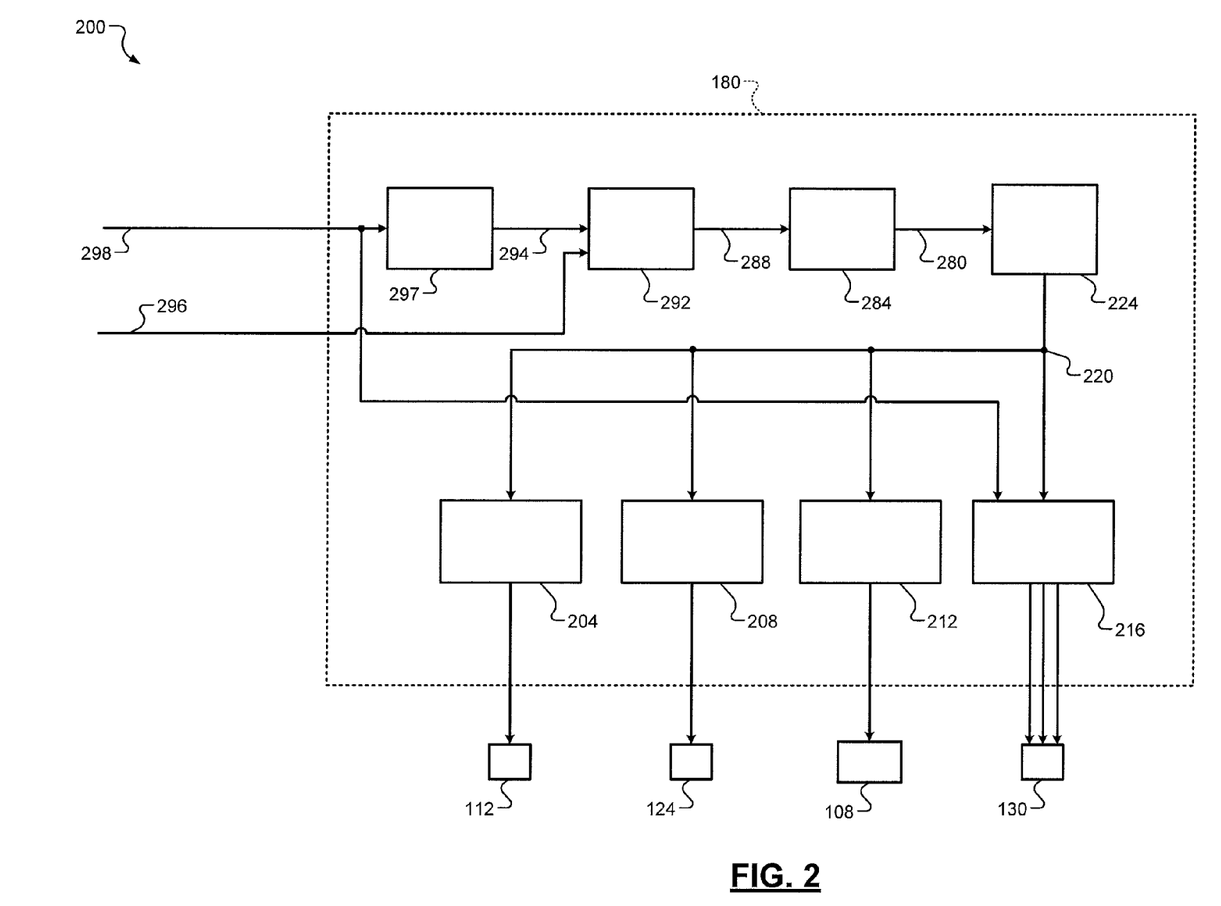
FIG. 2 is a functional block diagram of an example engine control system according to the present disclosure.

Referring now to FIG. 2, a functional block diagram of an example engine control system 200 is shown. A fuel control module 204 controls the fuel actuator module 112 to control fuel injection amount and timing. A spark control module 208 controls the spark actuator module 124 to control spark timing. A throttle control module 212 controls the throttle actuator module 108 to control opening of the throttle valve 106. A valve control module 216 controls the phaser actuator module 130 to control intake and exhaust camshaft phasing. The valve control module 216 may also control the phaser actuator module 130 to control intake and exhaust valve lift.

The fuel control module 204, the spark control module 208, the throttle control module 212, and the valve control module 216 may make control decisions based on an ignition mode 220. An ignition mode control module 224 may set the ignition mode 220 to one of the SI mode and the HCCI mode at a given time. Spark initiates combustion when the ignition mode 220 is set to the SI mode. Spark may be disabled when the ignition mode 220 is set to the HCCI mode.

Figure 3:
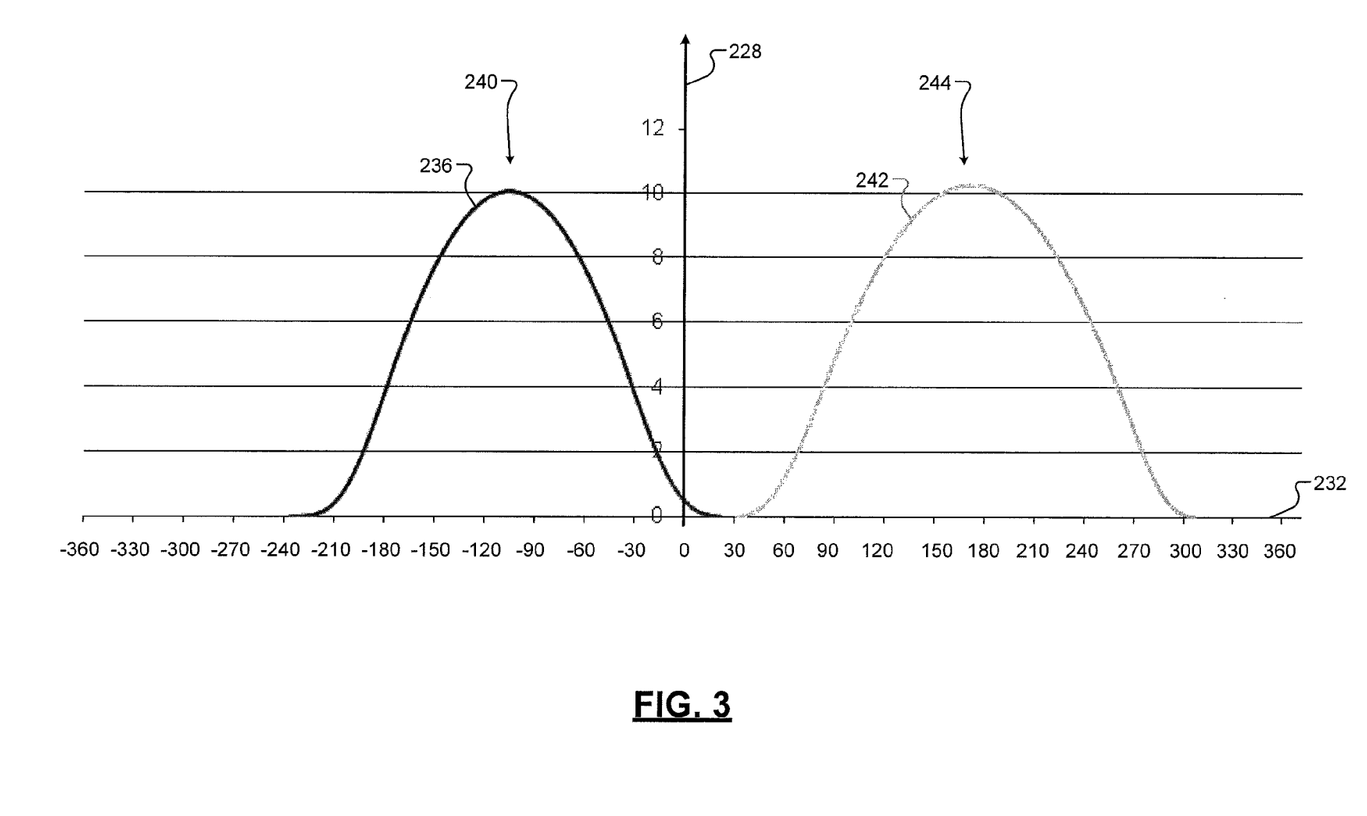
FIG. 3 is an example graph of valve lift as a function of crankshaft position during operation in a spark ignition (SI) mode.

The valve control module 216 operates the intake and exhaust valves in the high lift mode when the ignition mode 220 is in the SI mode. FIG. 3 includes an example graph of lift (distance) 228 (e.g., millimeters) of the intake and exhaust valves of a cylinder during operation in the SI mode. The lift 228 is graphed as a function of crankshaft position 232. The axis for the lift 228 intersects the axis for the crankshaft position 232 at the TDC position. One combustion cycle of the cylinder ends, and a next combustion cycle of the cylinder begins, at approximately the crankshaft position 232 where the axes intersect.

First example trace 236 tracks the lift 228 of the exhaust valve of the cylinder during operation in the SI mode. The exhaust valve is opened to a predetermined high lift position as indicated at 240. Second example trace 242 tracks the lift 228 of the intake valve of the cylinder during operation in the SI mode. The intake valve is opened to a predetermined high lift position as indicated at 244.

Figure 4:
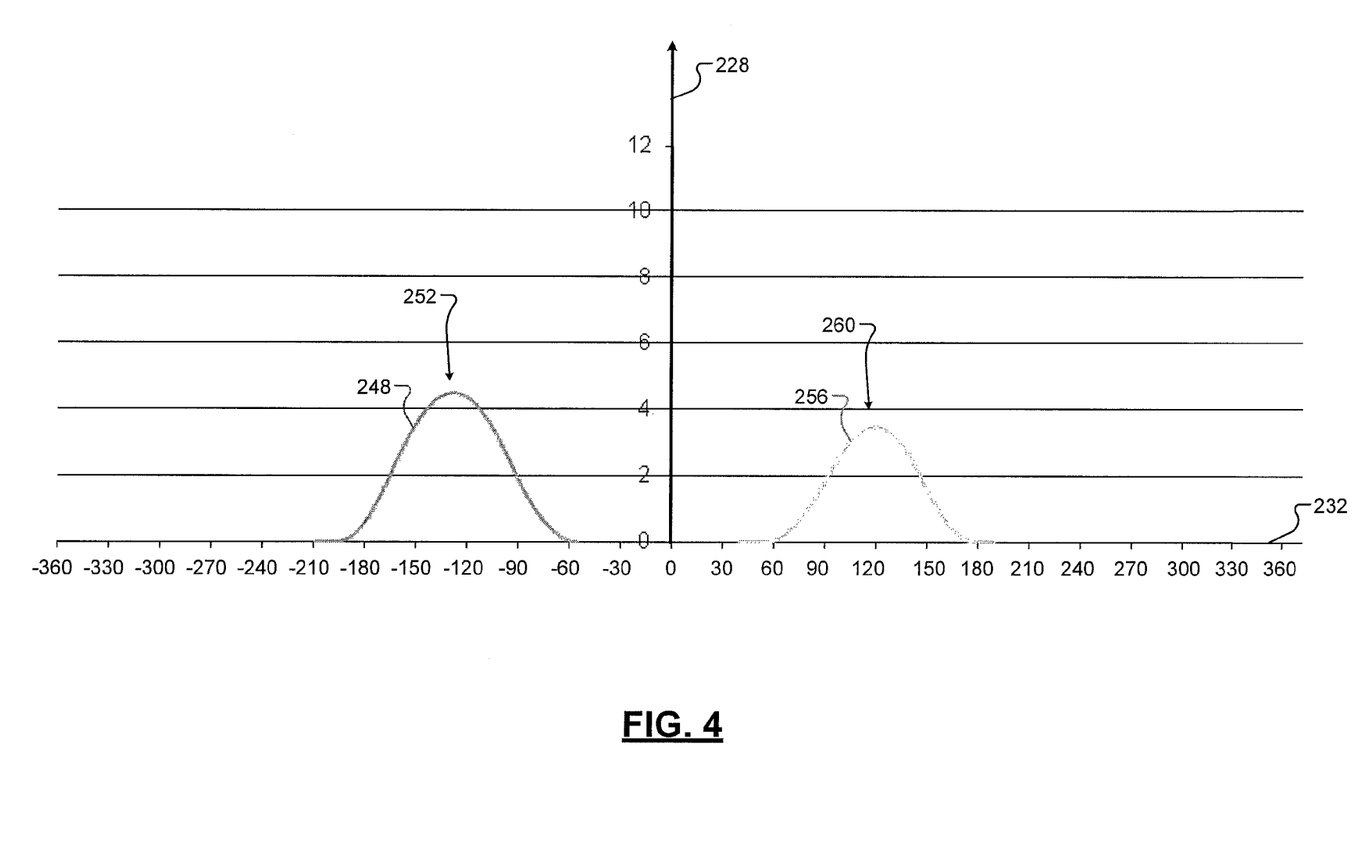
FIG. 4 is an example graph of valve lift as a function of crankshaft position during operation in a homogenous charge compression ignition (HCCI) mode.

Referring back to FIG. 2, the valve control module 216 operates the intake and exhaust valves in the low lift mode when the ignition mode 220 is in the HCCI mode. FIG. 4 includes an example graph of the lift 228 of the intake and exhaust valves of the cylinder during operation in the HCCI mode. The lift 228 is again graphed as a function of the crankshaft position 232. Again, one combustion cycle of the cylinder ends, and a next combustion cycle of the cylinder begins, at approximately the crankshaft position 232 where the axes intersect.

Third example trace 248 tracks the lift 228 of the exhaust valve of the cylinder during operation in the HCCI mode. The exhaust valve is opened to a predetermined low lift position as indicated at 252. Fourth example trace 256 tracks the lift 228 of the intake valve during operation in the HCCI mode. The intake valve is opened to a predetermined low lift position as indicated at 260.

Referring back to FIG. 2, when the ignition mode 220 transitions from SI mode to HCCI mode, the valve control module 216 controls operation of the intake and exhaust valves of the cylinder in a mixed high/low lift mode for at least one combustion cycle between the last combustion cycle of operation in the SI mode before a transition and a subsequent combustion cycle of operation in the HCCI mode. In the mixed high/low lift mode, the valve control module 216 operates the exhaust valve of the cylinder in the high lift mode and operates the intake valve of the cylinder in the low lift mode. After operating in the mixed high/low lift mode for the at least one combustion cycle, the valve control module 216 operates the intake and exhaust valves in the low lift mode for operation in the HCCI mode.

Operating in the mixed high/low lift mode for the at least one combustion cycle may provide more suitable engine operating conditions during first engine cycle of operation in the HCCI mode. More specifically, less residual exhaust gas may be present during the first engine cycle of operation in the HCCI mode. Less residual exhaust may allow a greater amount of fresh air to be drawn into the cylinders during the first engine cycle of operation in the HCCI mode. Additionally, less residual exhaust may decrease the temperature of the contents of the cylinder during the first engine cycle of operation in the HCCI mode. Less residual exhaust, lower temperature, and a greater amount of fresh air may minimize or prevent a decrease in engine torque output during the first engine cycle of operation in the HCCI mode. Additionally, less residual exhaust, lower temperature, and a greater amount of fresh air may minimize or prevent engine knock (or ringing).

Figure 5:
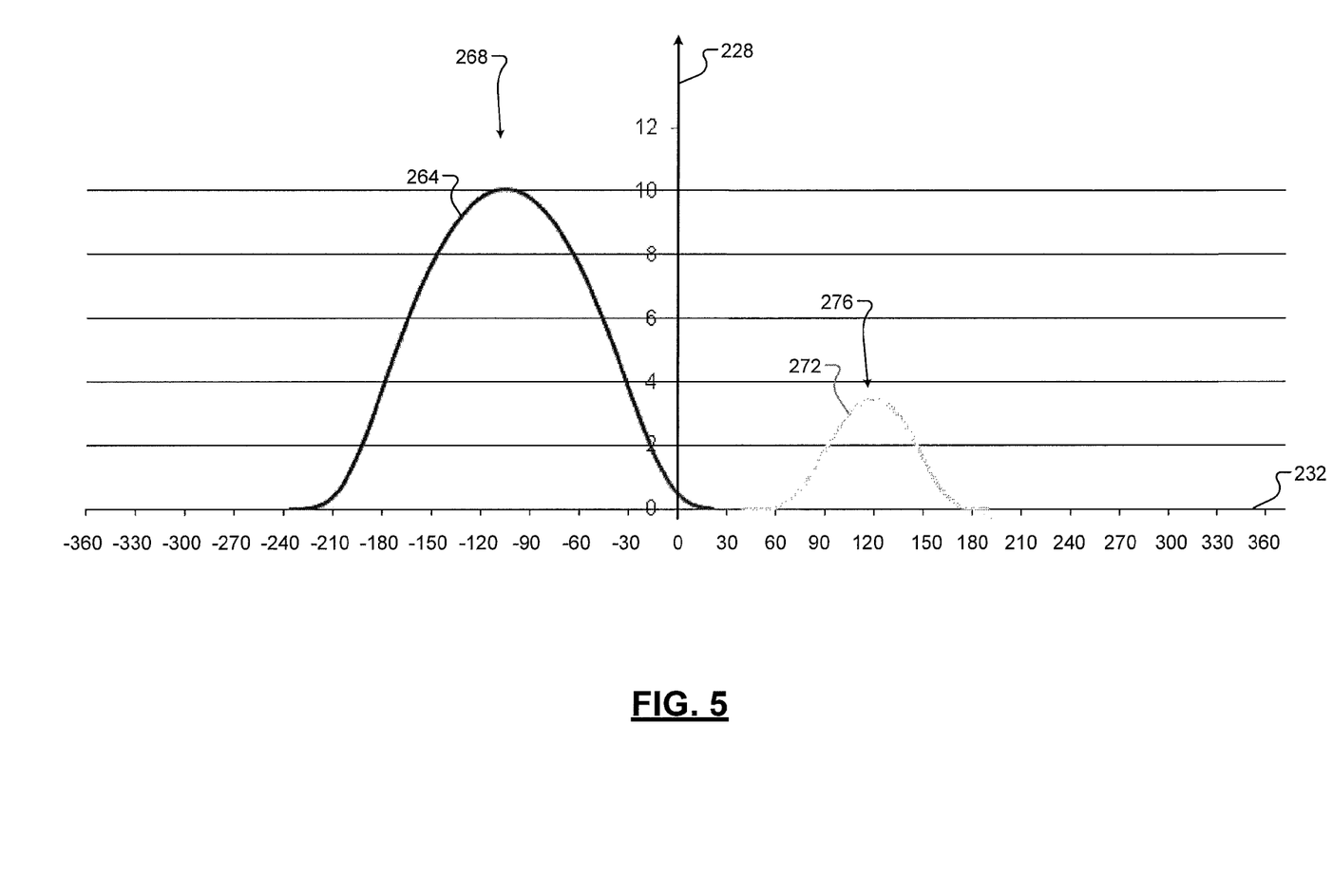
FIG. 5 is an example graph of valve lift as a function of crankshaft position during a transition from operation in the SI mode to operation in the HCCI mode.

FIG. 5 includes an example graph of the lift 228 of the intake and exhaust valves of the cylinder during the at least one combustion cycle of operation that occurs between operation in the SI mode and operation in the HCCI mode. The lift 228 is again graphed as a function of the crankshaft position 232. Again, one combustion cycle of the cylinder ends, and a next combustion cycle of the cylinder begins, at approximately the crankshaft position 232 where the axes intersect.

Fifth example trace 264 tracks the lift 228 of the exhaust valve of the cylinder during one combustion cycle of operation in the mixed high/low lift mode. The exhaust valve is opened to the predetermined high lift position as indicated at 268. Sixth example trace 272 tracks the lift 228 of the intake valve during the one combustion cycle of operation in the mixed high/low lift mode. The intake valve is opened to the predetermined low lift position as indicated at 276.

In sum, the valve control module 216 controls operation of the intake and exhaust valves in the high lift mode during operation in the SI mode, as shown in the example of FIG. 3. When the ignition mode 220 is transitioned from the SI mode to the HCCI mode, the valve control module 216 operates the intake valves in the low lift mode during the next engine cycle following the transition, as shown in the example of FIG. 5. The valve control module 216, however, maintains operation of the exhaust valves in the high lift mode during the next engine cycle following the transition, as also shown in the example of FIG. 5. HCCI or SI can be used during the next engine cycle while the intake valves are operated in the low lift mode and the exhaust valves are operated in the high lift mode. Once the next engine cycle is complete, the valve control module 216 may operate the exhaust valves in the low lift mode for operation in the HCCI mode, as shown in the example of FIG. 4. The intake valves are also operated in the low lift mode during operation in the HCCI mode.

Referring again to FIG. 2, the ignition mode control module 224 may set the ignition mode 220 to one of the SI mode and the HCCI mode at a given time based on an engine load 280 and/or one or more other suitable parameters. For example only, the ignition mode control module 224 may set the ignition mode 220 to the SI mode when the engine load 280 is greater than a predetermined engine load. Conversely, the ignition mode control module 224 may set the ignition mode 220 to the HCCI mode when the engine load 280 is less than the predetermined engine load.

An engine load module 284 may determine the engine load 280. For example only, the engine load module 284 may determine the engine load 280 based on an air per cylinder (APC) 288 and/or one or more other suitable parameters. An APC module 292 may determine the APC 288. The APC 288 may represent an amount (e.g., mass) of air that will be present within a cylinder for a combustion event. The APC module 292 may determine the APC 288 based on an engine speed 294, a MAF 296, and/or one or more other suitable parameters. The MAF 296 may be generated, for example, based on the measurements of the MAF sensor 166. An engine speed module 297 may generate the engine speed 294, for example, based on a crankshaft position 298. The crankshaft position 298 may be generated, for example, based on measurements of the crankshaft position sensor 160.

Figure 6:
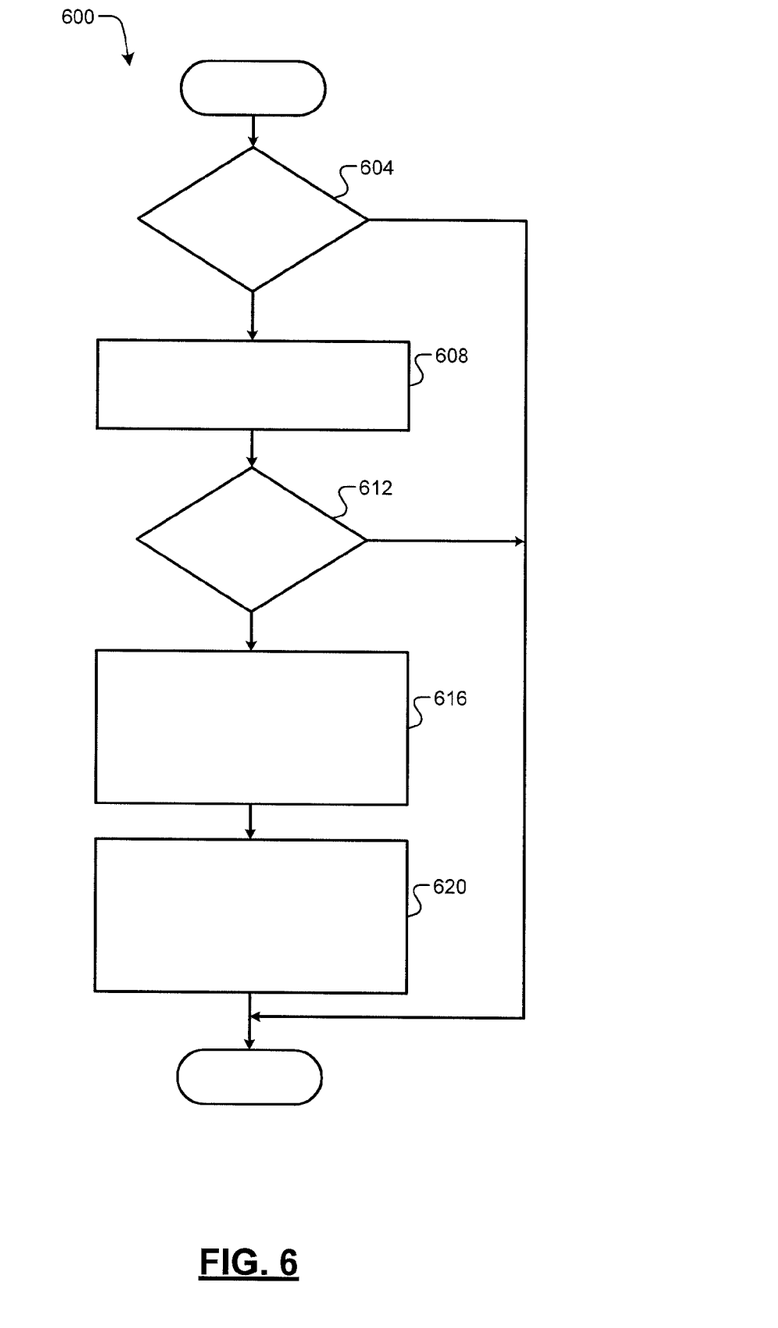
FIG. 6 is a flowchart depicting an example method of controlling valve lift for a transition from the SI mode to the HCCI mode according to the present disclosure.

Referring now to FIG. 6, a flowchart depicting an example method 600 of controlling intake and exhaust valve lift for a transition from operation in SI mode to HCCI mode is presented. Control may begin with 604 where control determines whether the ignition mode 220 is set to the SI mode. If true, control continues with 608. If false, control may end.

At 608, control operates the intake and exhaust valves in the high lift mode. In other words, high lift cam lobes regulate opening of the intake and exhaust valves. Control determines whether the ignition mode 220 transitioned from the SI mode to the HCCI mode at 612. If true, control continues with 616. If false, control may end.

At 616, during the next engine cycle, control maintains operation of the exhaust valves in the high lift mode. Control operates the intake valves in the low lift mode during the next engine cycle after the transition at 616. At 620, during the engine cycle following the next engine cycle, control operates the intake and exhaust valves in the low lift mode for operation in the HCCI mode. Control may operate the exhaust valves in the high lift mode and the intake valves in the low lift mode for one or more additional engine cycles before operating the intake and exhaust valves in the low lift mode at 620. Control may then end. While control is shown and discussed as ending, the method 600 may be illustrative of one control loop and control may return to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for a vehicle, comprising:
a mode control module that selectively sets an ignition mode for an engine to one of a spark ignition (SI) mode and a homogenous charge compression ignition (HCCI) mode; and
a valve control module that, in response to the ignition mode transitioning from the SI mode to the HCCI mode during a first engine cycle, operates an exhaust valve in a high lift mode during a second engine cycle, operates an intake valve in a low lift mode during the second engine cycle, and operates the exhaust and intake valves in the low lift mode during a third engine cycle,
wherein the first engine cycle is before the second engine cycle, and the second engine cycle is before the third engine cycle.

2. The system of claim 1 further comprising a spark control module that selectively provides spark during the first engine cycle and that disables spark during the third engine cycle.

3. The system of claim 2 wherein the spark control module selectively provides spark during the second engine cycle.

4. The system of claim 2 wherein the spark control module disables spark during the second engine cycle.

5. The system of claim 1 wherein the first, second, and third engine cycles are consecutive engine cycles.

6. The system of claim 1 wherein, during at least one additional engine cycle that occurs between the second and third engine cycles, the valve control module operates the exhaust valve in the high lift mode and operates the intake valve in the low lift mode.

7. The system of claim 1 wherein the valve control module operates the intake and exhaust valves in the high lift mode during the first engine cycle.

8. The system of claim 1 further comprising an engine load module that determines an engine load,
wherein the mode control module selectively sets the ignition mode based on the engine load.

9. The system of claim 8 wherein the mode control module selectively sets the ignition mode to the SI mode when the engine load is greater than a predetermined engine load and selectively sets the ignition mode to the HCCI mode when the engine load is less than the predetermined engine load.

10. A method for a vehicle, comprising:
selectively setting an ignition mode for an engine to one of a spark ignition (SI) mode and a homogenous charge compression ignition (HCCI) mode; and
in response to the ignition mode transitioning from the SI mode to the HCCI mode during a first engine cycle:
operating an exhaust valve in a high lift mode during a second engine cycle;
operating an intake valve in a low lift mode during the second engine cycle; and
operating the exhaust and intake valves in the low lift mode during a third engine cycle,
wherein the first engine cycle is before the second engine cycle, and the second engine cycle is before the third engine cycle.

11. The method of claim 10 further comprising:
selectively providing spark during the first engine cycle; and
disabling spark during the third engine cycle.

12. The method of claim 11 further comprising selectively providing spark during the second engine cycle.

13. The method of claim 11 further comprising disabling spark during the second engine cycle.

14. The method of claim 10 wherein the first, second, and third engine cycles are consecutive engine cycles.

15. The method of claim 10 further comprising, during at least one additional engine cycle that occurs between the second and third engine cycles:
operating the exhaust valve in the high lift mode; and
operating the intake valve in the low lift mode.

16. The method of claim 10 further comprising operating the intake and exhaust valves in the high lift mode during the first engine cycle.

17. The method of claim 10 further comprising:
determining an engine load; and
selectively setting the ignition mode based on the engine load.

18. The method of claim 17 further comprising:
selectively setting the ignition mode to the SI mode when the engine load is greater than a predetermined engine load; and
selectively setting the ignition mode to the HCCI mode when the engine load is less than the predetermined engine load.

* * * * *

UNITED STATES PATENT AND TRADEMARK OFFICE
CERTIFICATE OF CORRECTION

PATENT NO. : 8,776,737 B2  
APPLICATION NO. : 13/344855  
DATED : July 15, 2014  
INVENTOR(S) : Ethan E. Bayer et al.

Page 1 of 1

It is certified that error appears in the above-identified patent and that said Letters Patent is hereby corrected as shown below:

On the Title Page (75) the fourth listed Inventor, Hanho Kang:

Delete "Kang" and insert --Yun-- therefor.

Signed and Sealed this  
Second Day of February, 2016

Michelle K. Lee  
*Director of the United States Patent and Trademark Office*